United States Patent Office 3,084,118
Patented Apr. 2, 1963

3,084,118
REFINING OF COAL HYDROGENATION
PRODUCT
Donald C. Overholt, Scott Depot, Grover D. Roy, Dunbar, and Roy R. Warren, St. Albans, W. Va., assignors to Union Carbide Corporation, a corporation of New York
No Drawing. Filed Aug. 10, 1959, Ser. No. 832,451
11 Claims. (Cl. 208—265)

This invention relates to chemical processes. More particularly, it relates to an improved method for refining liquid coal hydrogenation product.

The liquid product resulting from the hydrogenation of coal ordinarily contains ash, unreacted carbon residues and water, all of which are preferably removed prior to further processing and use of the liquid product. Numerous methods have been proposed for such removal, of which the most satisfactory have been distillation, centrifugation and filtration. These methods, while they will accomplish recovery, have severe inherent limitations and deficiencies. When distillation is employed it is not economically feasible to distill pitch away from ash and hence the desirable pitch product cannot be recovered ash-free. A further disadvantage to distillation is the mechanical difficulty of handling the still residue which has a softening point above 200° C. The coal hydrogenation liquid product has a viscosity between 65 and 2000 centipoises at a temperature of 55° C. and hence temperatures of 150° C. to 200° C. must be maintained if filtration or centrifugation is to be employed.

We have developed a refining process wherein ash, unreacted carbon residues and water are all removed from coal hydrogenation liquid product without the disadvantages of the conventional methods. According to the process of our invention, there is added to the liquid coal hydrogenation product a liquid hydrocarbon precipitant and as a coagulant, sulfuric acid. This results in the coagulation of a soft plastic-like sludge. Substantially all of the ash and carbon residues are in the sludge while the supernatant liquid is ash-free liquid product plus the precipitant. The sludge and supernatant liquid are readily separated as by decanting the liquid. The supernatant liquid is advantageously water-washed to remove residual sulfuric acid. The precipitant can then be removed from the liquid product in any convenient manner, as by distillation.

The sludge still contains appreciable amounts of liquid product which is desirably recovered. In one embodiment of the process of the invention this recovery is accomplished by extracting the sludge with an extractant such as acetone. The acetone supernatant liquid will contain ash-free liquid product and is readily separated from the sludge by filtration or similar means. The acetone is readily removed, as by distillation. The ash-free liquid product remaining can, if desired, be combined with the ash-free liquid product from the initial precipitation. In another embodiment of the invention the sludge from the original precipitation is distilled to recover the liquid product ash-free and leave a sludge. This latter method is not adapted to continuous operation because the sludge is difficult to handle as still residue. In either embodiment the final sludge is composed principally of ash and carbon residues and will also contain any metallic catalyst from the hydrogenation.

The process of the invention has the advantage of being a low temperature operation with readily handled compositions. The soft plastic-like sludge can be readily pumped, as of course can the supernatant liquids. Special equipment is unnecessary and heated filters, centrifuges, etc. are not required. The process of the invention can be applied to coal hydrogenation liquid product over a wide range of viscosities. Product with a viscosity as high as 2000 centipoises at a temperature of 55° C. can be readily processed and with care even high viscosity product can be employed as feed. While the process has been described above as a batch process, it is readily adaptable to continuous operation. Thus, the precipitant can be continuously introduced with a flowing line of liquid coal hydrogenation product with subsequent addition of the sulfuric acid at a point somewhat below the precipitant addition point. The resulting slurry mixture can be collected in a settling vessel from which the supernatant liquid and plastic-like sludge can be continuously pumped to subsequent operations in the process.

The addition of the precipitant and of the acid are ordinarily made at ambient temperature. Upon addition of the acid the temperature may rise due to the heat of hydration as the contained water is contacted. The temperature is preferably kept at about 35° C. or below, either by control of the rate of addition of the acid or by heat exchange equipment if desired.

The precipitant employed may be aromatic hydrocarbons or aliphatic hydrocarbons or a mixture of both. As the percentage of aliphatics increases the amount of pitch precipitated in the sludge will increase. As it is ordinarily desirable to leave as much pitch as possible in the supernatant liquid a highly aromatic liquid precipitant is desirable, such as benzene, toluene, xylene or mixtures of such aromatics. Benzene is particularly preferred because its low boiling point permits its ready removal from the supernatant liquid by distillation. Also quite useful are crude commercial mixtures of aromatic hydrocarbons, particularly those from which substantially all of the unsaturated aliphatics have been removed. A precipitant such as heptane can be used if a liquid product free of medium pitch is desired. Heptane will precipitate both medium and heavy pitch. It is to be understood that while the precipitants employed in the process are nominally hydrocarbons, the use of the term "hydrocarbons" does not exclude the presence of small quantities of compounds containing other elements, as are commonly found associated with hydrocarbons. The quantity of precipitant employed will ordinarily be from 50 to 100 parts by weight of diluent per 100 parts by weight of coal hydrogenation liquid product, with about 70 parts by weight of precipitant ordinarily preferred. The larger proportions are employed with higher viscosity liquid product.

The preferred acid is concentrated sulfuric acid, from 90 to 100 percent acid, although aminosulfonic acid, $NH_2SO_3H$, may also be used. The quantity of acid used will ordinarily be between about 2 and about 5 pounds of sulfuric acid (on a 98 percent acid basis) per 100 pounds of liquid coal hydrogenation product. At least 2 pounds of acid, if not more, will be required to precipitate all the ash, while more than 5 pounds will precipitate more sludge than is desirable.

After the initial precipitation with a precipitant such as benzene the separation of the supernatant liquid from the sludge is ordinarily accomplished at ambient temperature by allowing the sludge to settle out whereby the liquid can be drawn off the top. While not ordinarily needed, such aids to separation as filters, centrifuges, etc. can be employed if desired. The liquid, after separation from the sludge, is conveniently washed with water at a temperature of 50° C. to 60° C. to remove residual acid. The temperature of about 50° C. to 60° C. is maintained during the washing to facilitate separation of the wash-water phase from the liquid product. The washing may be done as a batch process or as a continuous countercurrent system using a liquid-liquid contactor such as a pulse or rotating disk contactor. Removal of the precipitant from the liquid product is readily accomplished by distillation in most instances, although other methods of separation such as extraction could be employed if desired.

After the addition of the extractant such as acetone to the sludge, a slurry is formed from which the acetone supernatant liquid is readily recovered by any convenient means. We have found filtration to be most suitable although centrifuging, settling out and the like can also be used. The addition of the acetone and the separation of the acetone supernatant liquid from the granular sludge are normally done at ambient temperature. From about 30 to 60 pounds of acetone per 100 pounds of sludge may be employed. At least 28 pounds is necessary for adequate extraction of the sludge while higher ratios permit better recovery of light and medium pitch from the sludge. The use of more than 60 pounds confers no appreciable added benefit. The acetone is readily removed from the slurry by any convenient means such as distillation.

*Example 1*

The material to be refined was a liquid coal hydrogenation product having a viscosity of 108 centipoises at a temperature of 55° C. and containing, by weight, 15.38 percent light oil, 21.25 percent middle oil, 29.01 percent pasting oil, 11.64 percent light pitch, 2.69 percent medium pitch, 0.06 percent heavy pitch, 2.95 percent carbon residues, 8.12 percent ash and 6.52 percent water. To 100 pounds of this liquid product in a tank type reaction vessel was added 70 pounds of benzene. The mixture was agitated vigorously while 4.5 pounds of concentrated (98 percent) sulfuric acid was added over a five-minute period. The agitation was then continued for an additional five minutes, after which the mixture was allowed to settle for about five minutes. A soft, plastic-like sludge rapidly settled to the bottom of the reaction vessel, resulting in two sharply defined phases, a liquid phase and a sludge phase.

The supernatant liquid phase was decanted, leaving the sludge phase in the vessel. After water-washing to remove traces of sulfuric acid, the supernatant liquid contained 66.0 pounds of benzene, 8.1 pounds of light oil, 20.7 pounds of middle oil, 2.35 pounds of pasting oil, 10.1 pounds of light pitch, 2.9 pounds of medium pitch, no heavy pitch and 0.03 pound of ash. The sludge phase weighed 42 pounds. Thirteen pounds of acetone were added to the sludge and this mixture was agitated vigorously for about five minutes and was then allowed to settle for about five minutes, after which the supernatant liquid was decanted. The sludge remaining was again washed with 13 pounds of acetone in the same manner.

The sludge was then dried at a temperature of about 110° C. to remove residual acetone and there remained 15 pounds of dried coke, which contained no light pitch, 0.3 pound of medium pitch, 1.6 pounds of heavy pitch, 5.5 pounds of carbon residues, 7.4 pounds of ash and 0.2 pound of sulfuric acid. The combined acetone supernatant liquid contained 0.5 pound of light oil, 3.0 pounds of middle oil, 3.8 pounds of pasting oil and pitch, 0.9 pound of sulfuric acid and no ash.

*Example 2*

The material to be refined was a liquid coal hydrogenation product having a viscosity of 168 centipoises at a temperature of 55° C. and containing, by weight, 15.06 percent light oil, 16.46 percent middle oil, 23.3 percent pasting oil, 10.76 percent light pitch, 8.45 percent medium pitch, 3.13 percent heavy pitch, 6.25 percent carbon residues, 7.26 percent ash and 7.50 percent water. To 100 pounds of the liquid product in a tank type reaction vessel equipped with a propeller type stirrer was added 70 pounds of benzene. The mixture was agitated vigorously while 2.75 pounds of concentrated (98 percent) sulfuric acid was added over a five-minute period. The agitation was then continued for an additional five minutes, after which the mixture was allowed to settle for about five minutes. A soft, plastic-like sludge rapidly settled to the bottom of the reaction vessel, resulting in two sharply defined phases, a liquid phase and a sludge phase.

The supernatant liquid phase was decanted, leaving the sludge phase in the vessel. After water-washing to remove traces of sulfuric acid, the supernatant liquid contained 58.6 pounds of benzene, 11.5 pounds of light oil, 13.0 pounds of middle oil, 42.3 pounds of pasting oil and pitch combined, including 2.9 pounds of medium pitch, 0.1 pound of heavy pitch and 0.02 pound of ash. The sludge phase weighed 49.2 pounds and consisted of 2.0 pounds of light oil, 2.0 pounds of middle oil, 2.4 pounds of pasting oil, 1.3 pounds of light pitch, 3.4 pounds of medium pitch, 6.3 pounds of heavy pitch, 9.1 pounds of carbon residues, 7.6 pounds of ash, 0.9 pound of sulfuric acid, and, by difference, 14.2 pounds of benzene and water. A total of 12.4 pounds of acetone was added to the sludge and this mixture was agitated vigorously for about five minutes and was then allowed to settle for about five minutes, after which the supernatant liquid was decanted. The sludge remaining was again washed with 12.4 pounds of acetone in the same manner.

The sludge was then dried at a temperature of about 110° C. to remove residual acetone and there remained 25.5 pounds of dried coke which contained 0.4 pound of light pitch, 1.4 pounds of medium pitch, 6.3 pounds of heavy pitch, 9.1 pounds of carbon residues, 7.6 pounds of ash and 0.6 pound of sulfuric acid. The combined acetone supernatant liquid contained 2.0 pounds of light oil, 2.0 pounds of middle oil, 2.4 pounds of pasting oil, 0.9 pound of light pitch, 2.0 pounds of medium pitch, no heavy pitch, 0.34 pound of sulfuric acid and 0.004 pound of ash.

What is claimed is:

1. Process for refining liquid coal hydrogenation product which comprises adding to said product containing ash, unreacted carbon residues, and water and having a viscosity between 65 and 2,000 centipoises at a temperature of 55° C. from about 50 to about 100 parts by weight of liquid aromatic hydrocarbon precipitant per 100 parts by weight of said coal hydrogenation product and from about 2 to about 5 parts by weight of a coagulating agent selected from the group consisting of 98 percent sulfuric acid and 98 percent aminosulfonic acid per 100 parts by weight of said coal hydrogenation product, separating two fractions, the first fraction being a liquid phase consisting predominantly of ash-free liquid product and the precipitant, and the second fraction being a sludge phase consisting predominantly of ash and carbon residues, and removing the precipitant from said first fraction to yield an ash-free liquid product.

2. Process for refining liquid coal hydrogenation product which comprises adding to said product containing ash, unreacted carbon residues, and water and having a viscosity between 65 and 2,000 centipoises at a temperature of 55° C. from about 50 to about 100 parts by weight of a liquid aromatic hydrocarbon precipitant per 100 parts by weight of said coal hydrogenation product and from about 2 to about 5 parts by weight of a coagulating agent selected from the group consisting of 98 percent sulfuric acid and 98 percent aminosulfonic acid per 100 parts by weight of said coal hydrogenation product, separating two fractions, the first fraction being a liquid phase consisting predominantly of ash-free liquid product and the precipitant, and the second fraction being a sludge phase consisting predominantly of ash and carbon residues, removing the precipitant from said first fraction to yield an ash-free liquid product, extracting said second fraction with acetone to yield an extract of liquid product and removing the acetone from said extract to yield additional ash-free liquid product.

3. Process according to claim 1 wherein said precipitant is benzene.

4. Process according to claim 3 wherein said coagulating agent is sulfuric acid.

5. Process according to claim 3 wherein said coagulating agent is aminosulfonic acid.

6. Process according to claim 2 wherein said precipitant is benzene.

7. Process according to claim 2 wherein said precipitant is toluene.

8. Process according to claim 2 wherein said precipitant is xylene.

9. Process according to claim 2 wherein said precipitant is a mixture of benzene and toluene.

10. Process according to claim 2 wherein said coagulating agent is sufuric acid.

11. Process according to claim 2 wherein said coagulating agent is aminosulfonic acid.

References Cited in the file of this patent

UNITED STATES PATENTS

| | | |
|---|---|---|
| 1,645,679 | Axtell | Oct. 18, 1927 |
| 2,068,847 | Davis et al. | Jan. 26, 1937 |
| 2,185,951 | Rostler et al. | Jan. 2, 1940 |
| 2,209,123 | Koelbel | July 23, 1940 |